United States Patent [19]

Mastin

[11] Patent Number: 4,836,598
[45] Date of Patent: Jun. 6, 1989

[54] INSECT SCREEN ATTACHMENT APPARATUS FOR VEHICLES

[75] Inventor: Ronald D. Mastin, Allerton, Iowa

[73] Assignee: DFM Corporation, West Des Moines, Iowa

[21] Appl. No.: 45,402

[22] Filed: May 4, 1987

[51] Int. Cl.$^4$ .............................................. B60K 11/02
[52] U.S. Cl. ...................................... 296/91; 180/68.6
[58] Field of Search ............... 296/91, 95 Q; 180/68.6

[56] References Cited

U.S. PATENT DOCUMENTS

| | | | |
|---|---|---|---|
| 3,015,517 | 1/1962 | Thornburgh | 296/91 |
| 4,153,129 | 5/1979 | Redmond | 296/91 |
| 4,178,034 | 12/1979 | Mittendorf | 296/91 |
| 4,236,592 | 12/1980 | Ziegler | 296/91 |
| 4,364,596 | 12/1982 | Geisendorfer | 296/91 |
| 4,471,991 | 9/1984 | Matthias | 296/91 |
| 4,547,013 | 10/1985 | McDaniel | 296/91 |
| 4,621,860 | 11/1986 | Gerst | 296/91 |

Primary Examiner—Robert B. Reeves
Assistant Examiner—Joseph D. Pape
Attorney, Agent, or Firm—Cullen, Sloman, Cantor, Grauer, Scott & Rutherford

[57] ABSTRACT

A plurality of screen brackets are provided for attaching a bug screen or winter screen to a bug shield. Each screen bracket includes a first leg for mounting the screen bracket to the support leg of the bug shield and a second leg having a male snap thereon for receiving a corresponding female snap on the bug screen. The male snaps do not penetrate the shield member of the bug shield and therefore do not weaken or otherwise deface the bug shield.

3 Claims, 1 Drawing Sheet

U.S. Patent
Jun. 6, 1989
4,836,598
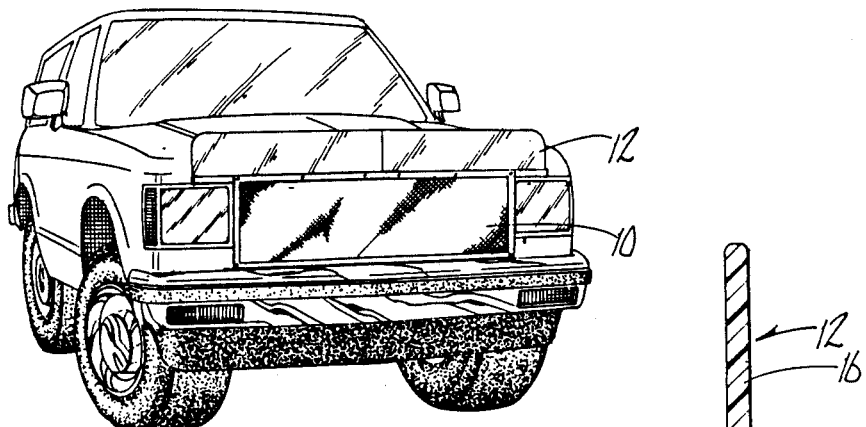
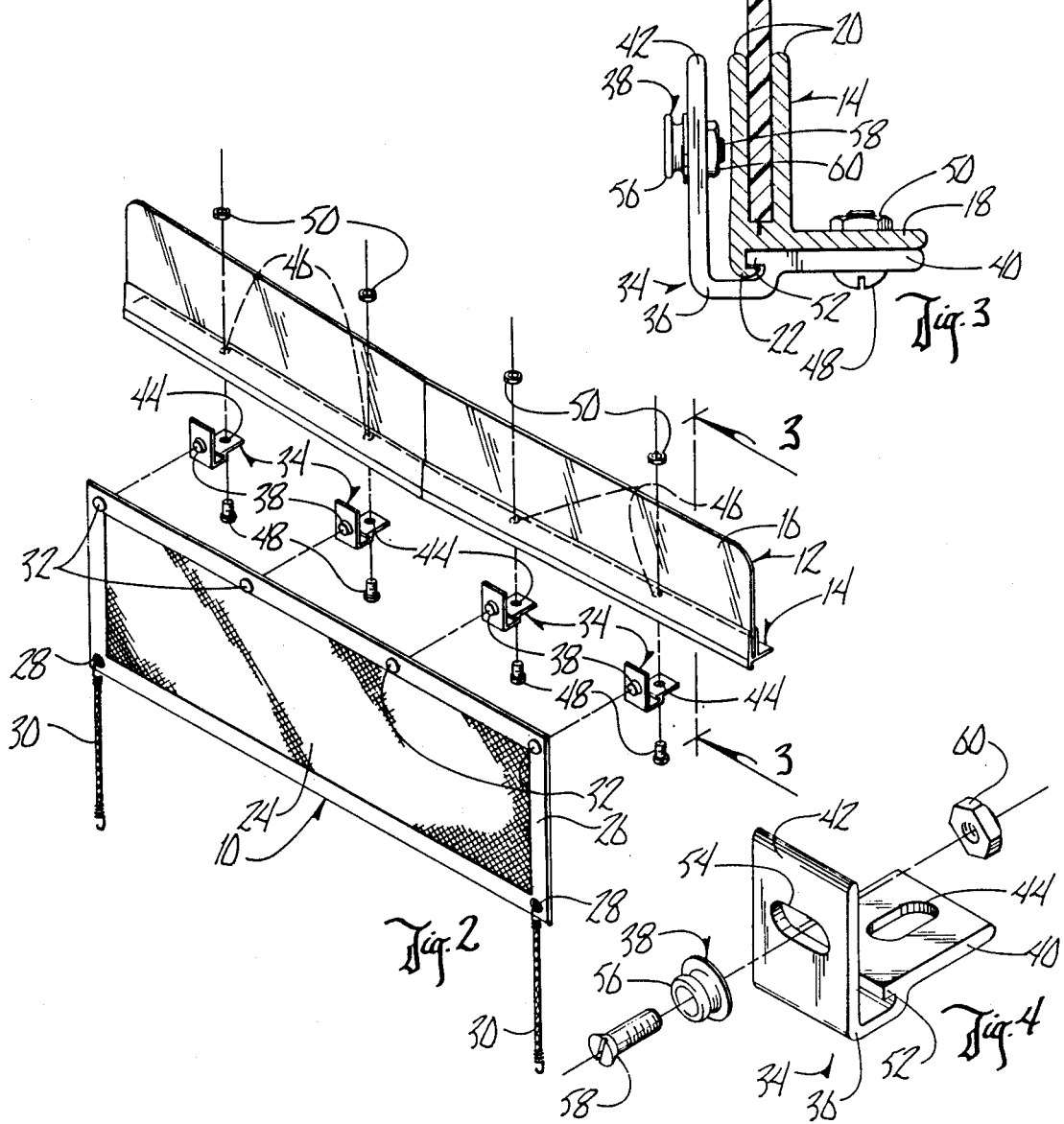

INSECT SCREEN ATTACHMENT APPARATUS FOR VEHICLES

BACKGROUND OF THE INVENTION

A popular accessory for automotive vehicles is a bug screen which is placed over the grill of the car to protect the grill and radiator from bugs and other debris. Another accessory is a winter screen or guard which is placed over the grill during cold weather such that the engine compartment is maintained at a warmer temperature. Such bug screens and winter screens are often used in conjunction with a bug shield, which is mounted on the hood of the car to deflect bugs and other debris away from the windshield when the vehicle is traveling.

The bug screen or winter screen has female snap members along the upper edge which are customarily snapped to male snap members which have been bolted through the channel and shield member of the bug shield. The lower edge of the screens are typically secured to the bumper of the vehicle by elastic cords or the like.

This conventional attachment of the screen to the bug shield requires that a hole be drilled through the channel of the bug shield and through the shield member which extends into the channel for support thereby. Such holes weaken the shield member and enhance the propogation of cracks therein. Also, such holes deface the bug shield and are unsightly when the screen is not attached thereto.

Accordingly, a primary objective of the present invention is an improved means for attaching a bug screen or winter screen to a bug shield.

Another objective of the present invention is the provision of an attachment means for securing a screen to a bug shield without penetrating the channel or shield member of the bug shield.

A further objective of the present invention is the provision of an attachment means for securing a bug screen or winter screen to a bug shield without defacing the bug shield.

Still another objective of the present invention is the provision of attachment means for attaching a screen to a bug shield which is adjustable, and which is quick and easy to install.

These and other objectives will become apparent from the following description of the present invention.

SUMMARY OF THE INVENTION

The means for attaching a bug screen or winter screen to a bug shield according to the present invention includes a plurality of spaced apart screen brackets, each having a male snap means secured thereto. More particularly, each screen bracket has a first leg which is adapted to be secured to the support member of the bug shield, which mounts the bug shield on the motor vehicle. The screen bracket also includes a second leg integrally connected to the first leg and extending in substantially a vertical plane so as to be positioned in front of the channel of this bug shield. The second leg has an elongated slot therein such that the snap means is longitudinally adjustable with respect to the bug shield, and whereby the male snap means are aligned with the female snap means of the screen. Each screen bracket also has a lip extending forwardly from the first leg which overlappingly engages a rearwardly extending lip on the support member of the bug shield so as to interlock the screen bracket with the bug shield bracket.

BRIEF DESCRIPTION OF THE DRAWINGS

FIG. 1 is a perspective view of a motor vehicle having a bug screen and bug shield mounted thereon according to the present invention.

FIG. 2 is an exploded perspective view showing the attachment of a bug screen to a bug shield using the screen brackets of the present invention.

FIG. 3 is a sectional side view taken along lines 3—3 of FIG. 2.

FIG. 4 is a perspective view of the screen bracket of the present invention.

DETAILED DESCRIPTION OF THE DRAWINGS

A motor vehicle is shown in FIG. 1 with a bug screen 10 and a bug shield 12 mounted thereon. As best seen in FIG. 3, bug shield 12 includes a bracket 14 and a shield member 16. Bracket 14 includes a support leg 18 for mounting the bug shield 12 to the vehicle and a pair of spaced apart legs 20 which form a channel for receiving shield member 16. Preferably, shield member 16 is held within the channel by adhesives or the like. Also, a lip 22 extends rearwardly on support leg 18.

As seen in FIG. 2, bug screen 10 includes a mesh screen portion 24 and a perimeter facing 26. A pair of eyelets 28 in each lower corner of the bug screen receive elastic cords 30 which are secured to the bumper of the vehicle. The plurality of female snap means 32 are spaced apart along the upper edge of the bug screen for securing the screen to the bug shield by the attachment means 34 of the present invention.

The described structure of bug screen 10 and bug shield 12 is conventional. Bug shield 10 can be replaced with a winter screen (not shown) which is essentially identical in construction to bug screen 10, except that a solid, non-mesh screen is used instead of mesh screen 24.

The present invention is directed towards attachment means 34, which is used to secure screen 10 to shield 12. Attachment means 34 includes a plurality of screen brackets or clips 36, each having a male snap means 38 mounted thereon. Each bracket 36 includes a first leg 40 and a second leg 42. First leg 40 includes a hole or slot 44 which is aligned with a hole 46 in the support leg 18 of the shield bracket 14. A bolt 48 extends through holes 44 and 46 and receives a nut 50 so as to secure screen bracket 36 to shield bracket 14, without having to drill a hole or otherwise penetrate shield member 16. A lip 52 on screen bracket 36 extends forwardly from first leg 40 and overlappingly engages the rearwardly facing lip 22 on the shield bracket 14, so as to further interlock the brackets and provide strength and stability thereto. As seen in FIG. 4, hole 44 may be elongated to facilitate the mounting of screen bracket 36 to shield bracket 14.

Second leg 42 of screen bracket 36 includes a slot 54 having a horizontally disposed major axis. The male snap means 38 includes a male stud 56, positioned on the front side of leg 42, a bolt 58 extending through stud 56 and slot 54, and a nut 60 on the back side of leg 42 for receiving bolt 58 and holding stud 56 in position on leg 42. The elongated slot 54 allows stud 56 to be longitudinally adjustable and thereby aligned with the corresponding female snap means 32 on the bug screen 10.

Thus, screen bracket 38 allows bug screen 10 to be attached to bug shield 12 without penetrating shield member 16 and without otherwise defacing the bug shield. Accordingly, the present invention accomplishes at least all of the stated objectives.

What is claimed is:

1. Attachment means for attaching a protective screen to a bug shield which is mounted on a vehicle, the bug shield having a shield member mounted in an elongated shield bracket, the shield bracket having a channel for receiving the shield member and a support member for mounting the bug shield on a motor vehicle, the attachment means comprising:

a plurality of female snap means on the screen;

a plurality of male snap means to which the female snap means are snapped; and mounting means for mounting the male snap means on the shield bracket without penetrating the shield member whereby the shield bracket supports the screen on the vehicle;

the mounting means include a plurality of spaced apart screen brackets each having a first leg adapted to be secured to the support member of the shield bracket and a second leg connected to the first leg, one male snap means being mounted on the second leg of each screen bracket;

wherein the support member of the shield bracket and the first leg of each screen bracket are substantially horizontally disposed and the channel of the shield bracket and the second leg of each screen bracket are substantially vertically disposed;

the shield bracket includes a lip extending rearwardly below the support member and each screen bracket includes a lip extending forwardly from the first leg, said lips overlapping one another to interlock each screen bracket with the shield bracket;

wherein said second leg of each screen bracket is spaced from and positioned in front of said shield bracket.

2. The attachment means of claim 1 wherein the second leg of each screen bracket has an elongated slot with a horizontally disposed major axis, the male snap means being adjustably mounted in the slot such that the male snap means are aligned with the female snap means.

3. The attachment means of claim 1 wherein each screen bracket has a hole in the first leg thereof which is aligned with a hole in a the support member of the shield bracket, the holes receiving a bolt means for securing the screen brackets to the shield bracket.

* * * * *